May 16, 1950     G. E. BJÖRKLUND     2,507,587
HAND PIECE FOR DENTAL DRILLS
Filed Aug. 6, 1947
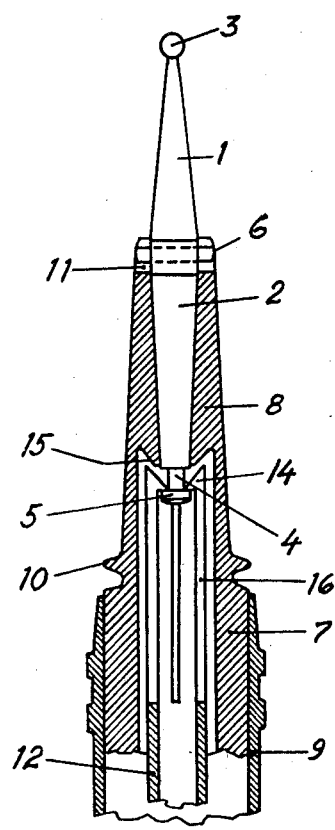
INVENTOR.
Gustaf Erik Björklund
BY Jarvis C. Marble
his Attorney Patented May 16, 1950

2,507,587

UNITED STATES PATENT OFFICE 2,507,587

HAND PIECE FOR DENTAL DRILLS

Gustaf Erik Björklund, Stockholm, Sweden

Application August 6, 1947, Serial No. 766,596
In Sweden August 12, 1946

4 Claims. (Cl. 32—26)

This invention relates to dentistry and more particularly to a hand piece, that is, a tool holder or drill chuck for receiving and holding dental drills during use.

In practicing dentistry and particularly in preparing to fill cavities in the teeth it is necessary to remove the decay and to undercut the cavity in order to properly hold a filling therein. For this purpose it has been customary to use drills having cutting portions of various sizes and shapes, and since in working on the rear teeth the space in which to work is small the dentist is normally supplied with what is commonly termed a contra-angle hand piece in which, because of the small space, relatively short drills are used. It has also been customary when working with a straight hand piece or tool holder on the front teeth to use relatively long drills, thus making it necessary for the dentist to have two complete sets of drills.

It is therefore an object of this invention to provide a straight hand piece or drill or other tool holder constructed to receive and hold relatively short drills commonly used in the contra-angle hand piece to thereby avoid the necessity of maintaining two sets of drills.

It is a further object of this invention to provide a straight hand piece or tool holder designed to receive and hold the relatively short drills commonly used in a contra-angle hand piece or tool holder of relatively simple and economical construction yet entirely adequate to perform the function for which it is designed and which is further provided with means to deflect and discharge by centrifugal force the chips which may fall from the cutting portion of the drill. If desired the hand piece according to this invention may be designed to accommodate the drill described and claimed in my copending application Serial No. 766,594 filed August 6, 1947.

Further objects and advantages of the invention will be apparent from the following description taken in conjunction with the accompanying drawing showing in fragmentary sectional view a preferred example of handpiece embodying the invention and designed to receive and hold a drill provided with a tapered shank and having a flange designed to deflect and throw off chips falling from the cutting portion of the drill.

With continued reference to the drawing, there is shown a dental drill 1 having a tapered shank 2 the angle of taper being what is known in the art as a sticky taper in order that the drill will be securely held in a chuck having a complementary tapered recess. The drill 1 is provided with a cutting portion 3 of any desired size or shape, this cutting portion being connected to the tapered shank 2 by a tapered spindle. Drill 1 is also provided at the end of the tapered shank remote from the cutting portion 3 with an annular groove 4 providing a flange or shoulder 5 by means of which the drill is clamped in a socket or chuck in a manner to be presently described. Drill 1 is also provided with a pin 6 passing through a point at substantially the greatest diameter of the drill and the protruding ends of this pin are adapted to engage the chuck in a manner to be presently described in order to properly drive the drill.

The hand piece of this invention is provided with a rotating spindle 7 having a tapered outwardly extending portion 8 provided with a tapered socket for receiving the drill 1. Spindle 7 is rotatably received in a fixed finger or hand engaging portion 9 whereby the hand piece may be gripped for convenient manipulation during use.

In using a dental drill, particularly in a more or less vertical position and with the cutting portion 3 of the drill 1 uppermost, chips resulting from the drilling operation tend to fall down the shaft of the drill and the spindle 7 and since there is usually considerable moisture present during this operation these chips have a tendency to pass between the rotating spindle and the fixed or finger engaging portion of the hand piece, thus causing excess wear and the necessity for frequent dismantling and cleaning of the hand piece. In order to avoid this undesirable result the rotating spindle 7 is provided with an annular shoulder or flange 10 closely adjacent the point where the rotatable spindle 7 enters the fixed portion 9 of the hand piece. Since the spindle 7 is rotating at a relatively rapid rate of speed, any chips falling or flowing down the outer surface of the spindle are discharged or deflected by the flange 10 due to centrifugal force. These chips are discharged in a direction tangential to the circumference of the flange 10 thus preventing entry of these chips into the bearings and interior of the fixed portion 9 of the hand piece.

In order that the drill 1 may be rotated by the spindle 7 without relative movement therebetween, the outer end of the spindle 7 is provided with a diametrical slot 11 in which the protruding ends of pin 6 passing through the drill 1 are received, thus providing a positive driving connection between the drill 1 and the spindle 7.

In order to tightly seat the tapered shank 2 of the drill 1 in the tapered socket of the spindle 7, the hand piece is provided with an axially movable sleeve 12 terminating in a plurality of spring fingers 16 having hook shaped ends 14 which are adapted to engage in the annular groove 4 behind the shoulder or flange 5 on the drill 1. It will therefore be seen that when the tapered shank 2 of the drill 1 is seated in the tapered socket of the spindle 7 the sleeve 12 may be moved axially away from the end of the spindle 7 thus drawing the shank 2 of the drill 1 tightly into the socket in the spindle 7 and maintaining the interengagement of pin 6 and slot 11.

When it is desired to remove the drill 1 from the spindle 7 it is only necessary to move the sleeve 12 toward the end of the spindle 7, at which time the hook shaped portions on spring fingers 16 will be cammed outwardly in a radial direction by engagement with tapered radial cam surface 15 on the inner surface of spindle 7 adjacent the inner end of the tapered socket in order to release hook portions 14 from the flange 5 and thus permit withdrawal of the drill 1 from the socket in the spindle 7.

It will thus be seen that by this construction there has been provided a straight hand piece constructed to efficiently receive and rotate relatively short drills of the type normally employed in a contra-angle hand piece and in which means has been provided for deflecting and preventing entry of chips into the interior of the hand piece whereby undue wear on the bearings thereof is prevented.

It will be obvious to those skilled in the art that various changes may be made in the invention without departing from the spirit and scope thereof and therefore the invention is not limited by that which is shown in the drawings and described in the specification but only as indicated in the appended claims.

Novel features of construction of the drill 1, herein disclosed but not claimed, comprise the claimed subject matter of my copending application Serial No. 766,594 filed August 6, 1947.

What I claim is:

1. A dental hand piece comprising a fixed finger engaging portion, a spindle rotatably mounted in said finger engaging portion, said spindle extending substantially beyond the end of said finger engaging portion and having a tapered outer surface whereby a minimum amount of space is required to accommodate said spindle, a tapered drill receiving socket in said spindle and a diametrical slot in the outer end thereof for interengagement with the protruding ends of a pin extending through a dental drill, an axially movable sleeve within said spindle, said sleeve terminating in a plurality of spring fingers having hook shaped ends constructed and arranged to engage in an annular groove and behind a shoulder provided on the inner end of said drill whereby said drill may be drawn into and tightly clamped in said tapered socket, and a tapered cam surface on the inner surface of said spindle adjacent the inner end of said tapered socket constructed and arranged to be engaged by said hook shaped ends upon outward axial movement of said sleeve whereby the same may be cammed outwardly to release said drill, said spindle being provided adjacent the end of said finger engaging portion with an annular flange whereby chips falling down or flowing along the outer surface of said spindle will be deflected and discharged by centrifugal force, thus preventing entry of said chips into the bearing in said hand piece.

2. A dental hand piece comprising a finger engaging portion, a spindle rotatably mounted in said finger engaging portion, said spindle extending substantially beyond the end of said finger engaging portion, a tapered drill receiving socket in said spindle, an axially movable sleeve within said spindle, said sleeve terminating in a plurality of spring fingers having hook shaped ends constructed and arranged to engage in an annular groove and behind a shoulder provided on the inner end of said drill whereby said drill may be drawn into and tightly clamped in said tapered socket, and a cam surface on the inner surface of said spindle adjacent the inner end of said tapered socket constructed and arranged to be engaged by said hook shaped ends upon outward axial movement of said sleeve whereby the same may be cammed outwardly to release said drill, said spindle being provided adjacent the end of said finger engaging portion with an annular flange whereby chips falling down or flowing along the outer surface of said spindle will be deflected and discharged by centrifugal force, thus preventing entry of said chips into the bearing of said hand piece.

3. A dental hand piece comprising a finger engaging portion, a spindle rotatably mounted in said finger engaging portion, said spindle extending substantially beyond the end of said finger engaging portion, a drill receiving socket in said spindle, an axially movable sleeve within said spindle, said sleeve terminating in a plurality of spring fingers having hooked shaped ends constructed and arranged to engage in an annular groove and behind a shoulder provided on the inner end of said drill whereby said drill may be drawn into and tightly clamped in said socket, and a cam surface on the inner surface of said spindle adjacent the inner end of said socket constructed and arranged to be engaged by said hook shaped ends upon outward axial movement of said sleeve whereby the same may be cammed outwardly to release said drill, said spindle being provided adjacent the end of said finger engaging portion with an annular flange whereby chips falling down or flowing along the outer surface of said spindle will be deflected and discharged by centrifugal force, thus preventing entry of said chips into the bearing in said hand piece.

4. A dental hand piece comprising a finger engaging portion, a spindle rotatably mounted in said finger engaging portion, said spindle extending substantially beyond the end of said finger engaging portion, a drill receiving socket in said spindle, an axially movable sleeve within said spindle, said sleeve terminating in a plurality of spring fingers having hooked shaped ends constructed and arranged to engage in an annular groove and behind a shoulder provided on the inner end of said drill whereby said drill may be drawn into and tightly clamped in said socket, and a cam surface on the inner surface of said spindle adjacent the inner end of said socket constructed and arranged to be engaged by said hook shaped ends upon outward axial movement of said sleeve whereby the same may be cammed outwardly to release said drill.

GUSTAF ERIK BJÖRKLUND.

REFERENCES CITED

The following references are of record in the file of this patent:

UNITED STATES PATENTS

| Number | Name | Date |
|---|---|---|
| 147,959 | Morrison | Feb. 24, 1874 |
| 213,167 | Brown | Mar. 11, 1879 |
| 215,932 | Justi | May 27, 1879 |
| 233,709 | Starr | Oct. 26, 1880 |